Oct. 21, 1969    H. HOEL    3,474,333
APPARATUS FOR DETERMINING DISTANCE-TO-FAULT
IN ELECTRICAL SYSTEMS
Filed Sept. 11, 1967    2 Sheets-Sheet 1

INVENTOR
Hans Hoel
BY
Misegades &
Douglas
ATTORNEYS

United States Patent Office 3,474,333
Patented Oct. 21, 1969

3,474,333
APPARATUS FOR DETERMINING DISTANCE-TO-FAULT IN ELECTRICAL SYSTEMS
Hans Hoel, Oslo, Norway, assignor to The English Electric Company Limited, London, England, a British company
Filed Sept. 11, 1967, Ser. No. 666,719
Claims priority, application Norway, Sept. 13, 1966, 164,704
Int. Cl. G01r 31/08
U.S. Cl. 324—52                                          9 Claims

ABSTRACT OF THE DISCLOSURE

This invention relates to apparatus for determining the distance between a supervisory station in an A.C. system and a fault affecting this system. In particular sensing means monitor both the system voltage and the system current at the station and first control means determine the voltage occurring at the instant at which the current traverses its zero datum whilst second control means determine the derivative ($di/dt$) of the current at that instant. Output means measure the ratio between these qualities whereby to derive the inductance of the system and determine the said distance by comparing this inductance value with that of the unfaulted system.

Thus, in accordance with this invention, use is made of the fact that at the instant of current zero the voltage drop in the ohmic resistance of the system e.g. a transmission line, is zero whilst the voltage drop due to those components possessing inductive reactance is proportional to the first derivative of the current at this instant ($di/dt$). Since $V=Ldi/dt$ then the inductance of the line under the prevailing conditions is readily derived and by comparing this with known values of this quantity at all positions along the line under healthy conditions the actual distance to the fault may be determined.

---

This invention relates to apparatus for determining the distance between a fault occurring in an electrical system and a defined datum position in that system, e.g. it is operative to measure the distance between a power transmission line terminal or distribution station and a short-circuit affecting the line.

The present invention consists in apparatus for determining the distance between a supervisory station in an A.C. system and a fault affecting this system, comprising first means for monitoring the system voltage at said station, second means for monitoring the system current and sensing the instant at which it traverses its zero datum, control means for determining the voltage occurring at said instant and the derivative of the current at that instant and output means for measuring the ratio between these quantities whereby to derive the inductance of the system and determine the said distance by comparing this inductance value with that of the unfaulted system.

The A.C. system may be a power transmission line and the apparatus may conveniently be operative only in response to the occurrence of a tripping signal for a protective circuit-breaker in the line, the voltages proportional to line voltage and the derivative of line current being derived before the circuit-breaker opens. In particular, only one half cycle is needed to obtain the relevant values of these quantities but in practice a mean value of each of these quantities is obtained over, say, two cycles before the measurement is effected (provided that the breaker operating time permits this) in order to overcome any 'local' irregularities due to transient phenomena etc.

Thus, in accordance with this invention, use is made of the fact that at the instant of current zero the voltage drop in the ohmic resistance of the line is zero whilst the voltage drop due to those components possessing inductive reactance is proportional to the first derivative of the current at this instant ($di/dt$). Since $V=Ldi/dt$ then the inductance of the line under the prevailing conditions is readily derived and by comparing this with known values of this quantity at all positions along the line under healthy conditions the actual distance to the fault may be determined. In some cases, particularly where saturating transformers are employed, more accurate measurements may be obtained if the current derivative is determined at an instant immediately following the zero transition of the current waveform since some degree of magnetic remanence may otherwise effect this quantity, and it is to be understood that references herein to "current zero" cover sensibly minor deviations from this instant.

In order that the invention may be fully understood, one embodiment thereof will now be described, by way of example, with reference to the accompanying drawings, in which.

FIGS. 3(a) to 3(d) illustrate various waveforms obtained in different parts of this apparatus, reference to which will serve as an aid to understanding the invention.

Figure 1:
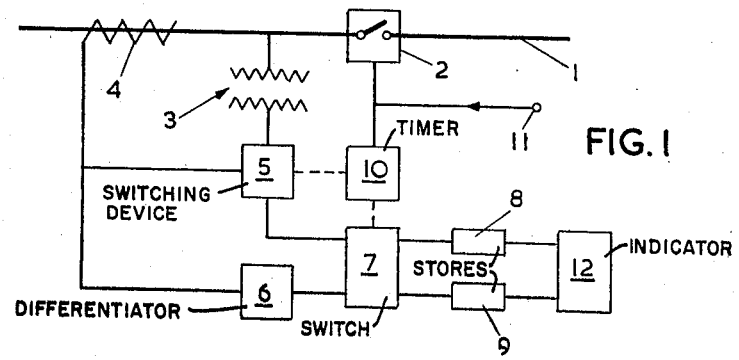
FIG. 1 illustrates a block diagram of apparatus according to this invention.

Referring now to the drawings FIG. 1 shows apparatus according to the invention for determining the position of a fault affecting a power line 1, and in particular determining the exact distance of the fault from a particular location.

A circuit-breaker 2 is located in this power line 1 and coupled to it are a voltage transformer 3 and a current transformer 4. The output from the voltage transformer is applied to a switching device 5 which is governed by the current input from transformer 4 for sampling the voltage waveform occurring between adjacent instants at which the voltage and current waveforms traverse their zero datum. The output from the current transformer 4 is also applied to a differentiator circuit 6 which is operative to develop at its output a voltage which is the derivative of the current at the instant at which it traverses zero.

The voltage outputs from the switching device 5 and the differentiator 6 are applied through a switch 7 to storage circuits 8, 9, the switch 7 being closed for a predetermined period by a timing circuit 10 operated in response to a tripping signal for the circuit-breaker 2 from an input terminal 11.

The quantity stored in the circuit 8 is thus a voltage value (V) proportional to the line voltage obtaining at the instant of current zero and the quantity stored in the circuit 9 is a voltage value proportional to the derivative of the line current ($di/dt$). The relative magnitude or ratio of these two voltages is then determined in an output device 12 which is operable to provide from this information an indication of the distance from this location to the fault, since it is indicative of the line inductance under the fault condition $V=L\ (di/dt)$.

Referring now to FIGURES 2 and 3(a) to 3(d) the detail of this apparatus and its mode of operation will be more particularly described. However, reference is initially made to the timing circuit 10 which is not shown in detail since it is conventional in construction and may conveniently comprise an RC circuit which, in response to the tripping signal, applies its charging current to an electromagnet for a short period until the capacitor voltage attains a certain level. This voltage may then be limited to this level whereupon the induced E.M.F. in the electromagnet coil collapses to zero; the electromagnet, and accordingly the switch 7, may thus be closed for a period of, say, two cycles following the initiation of the tripping signal.

Considering now the main components, the output from the current transformer 4 is applied to a transformer 13 in the device 5 to the secondary of which is connected a switch 14 and a coil 15. When the switch 14 is closed, e.g. in response to a signal from the timing circuit 10, the coil is successively energised in opposite directions in accordance with the input signal to move a change-over contact 16, connected to its armature, between two fixed contacts 17, 18. A resistor 20 is connected to these contacts and an alternating voltage is developed across this resistor having a value dependent on the proportion of the secondary voltage tapped off a transformer 21, coupled to the voltage transformer 3. Two opposed diodes 22, 23 are also connected across these contacts; a Zener diode 24 being connected between the terminals 26, 27, i.e. between the junction of these diodes and the contact 16. Thus, when this movable contact lies against the contact 18, and the voltage across the resistor 20 is such that it has positive polarity on terminal 17 and negative on terminal 18 then current flows through the diode 22 and back through this contact 16 so that a voltage is developed across the terminals 26, 27. When the contact 16 changes over, however, at the instant of zero current from transformer 13, the current path is broken until the voltage polarity on transformer 21 changes when current again flows through this path via diode 23. Thus, a series of voltage "pulses" are developed across terminals 26, 27 (FIG. 3(b)) corresponding to the secondary voltage waveform on transformer 21 (FIG. 3(a)) sampled during the periods for which the secondary current on transformer 13 (FIG. 3(c)) successively closes the change-over contact 16 on the contacts 17 and 18.

The ganged contacts 29, 30 of the switch 7 are closed by the timing device 10 upon the initiation of a tripping signal as mentioned above, and accordingly these voltage pulses are applied through the closed contacts 29 to charge a capacitor 31 in the storage circuit 8, this capacitor storing the maximum voltage value of these individual pulses and performing a certain degree of integration to avoid the possibility of a false response to individual irregularities in the voltage pulses.

The output from the current transformer 4 is also applied to a transformer 32 in the differentiator 6. The secondary winding of this transformer has one end connected to a pair of parallel-connected capacitors 34, 35 bridged by a resistor 36 and the other end connected to a junction between two coils 37, 38, the other ends of these coils being connected to the capacitor-resistor junctions by diodes 39, 40.

Figure 3:
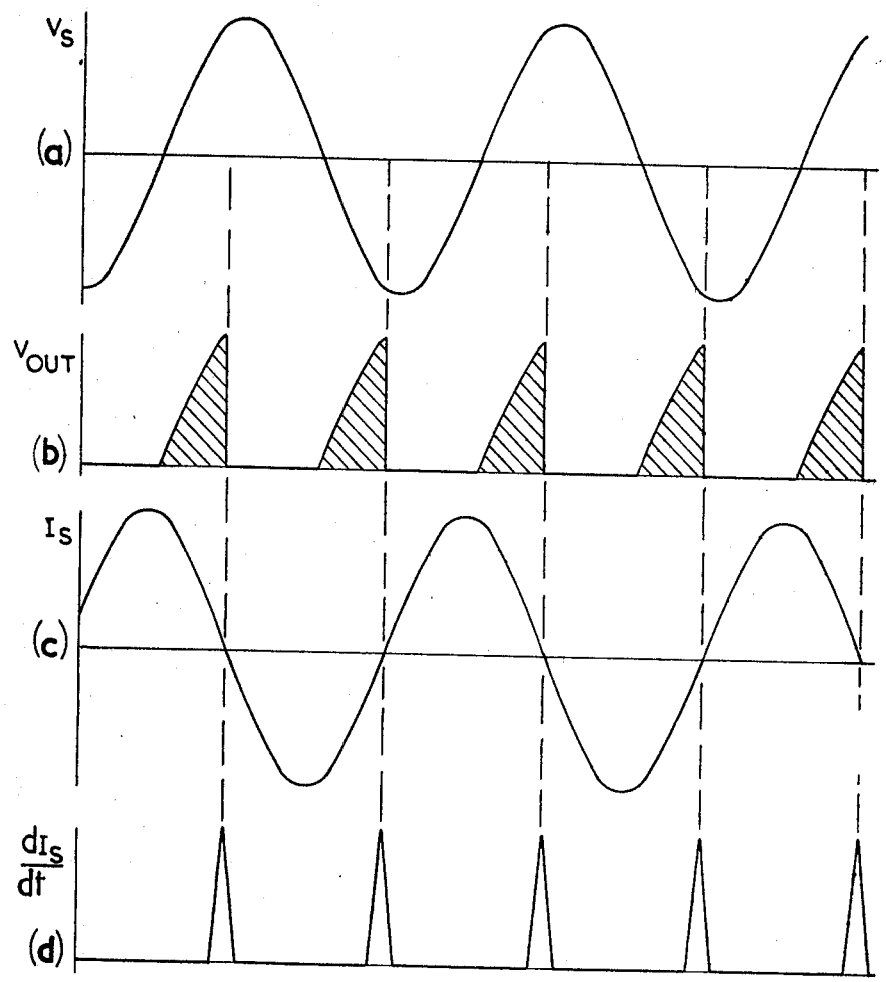
Figure 2:
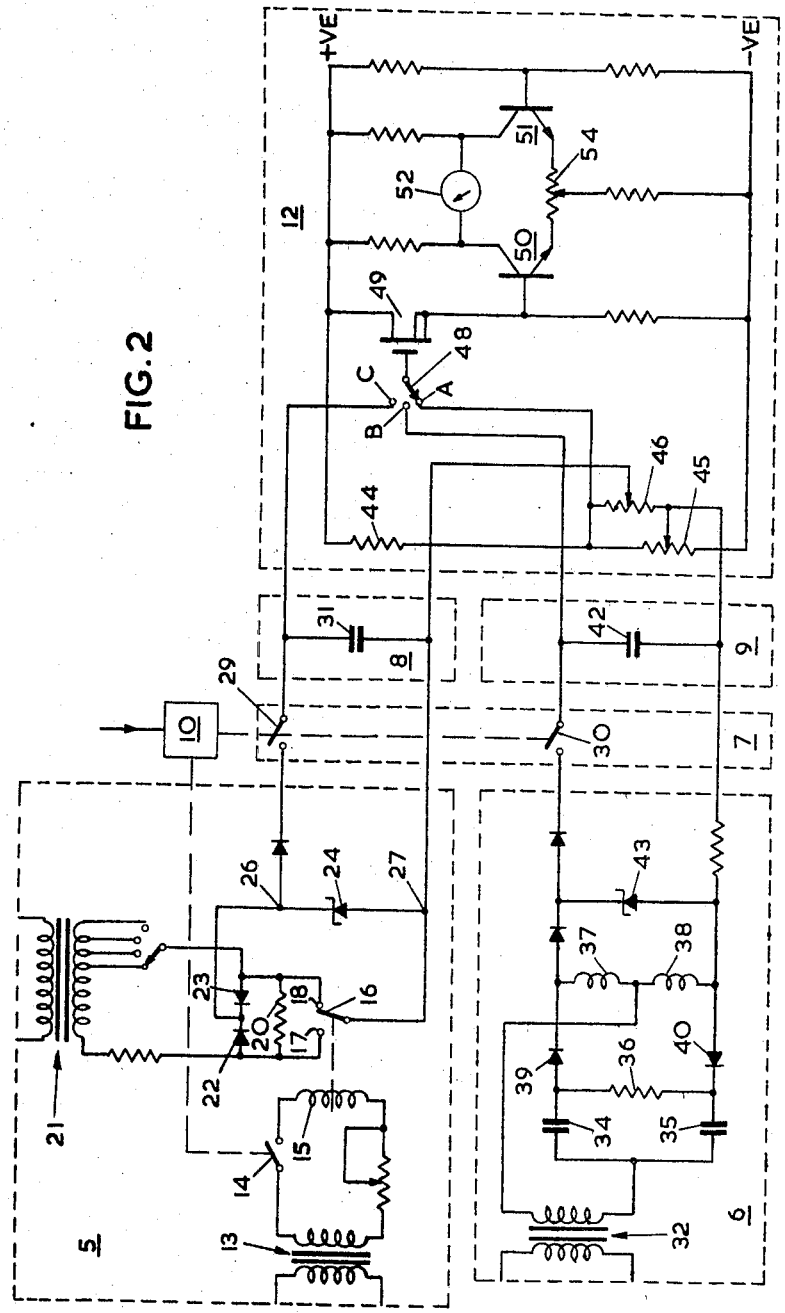
FIG. 2 is a more detailed circuit diagram of the apparatus shown in FIG. 1.

The alternating secondary voltage, which is proportional to the line current, is differentiated by this circuit 6, the diodes 39, 40 conducting during successive cycles so as to present a steep wave front to the appropriate coil 37, 38 necessary to produce the peaked impulse, the residual charge on the capacitors 34, 35 serving to damp the tendency for "ringing." Thus, unidirectional pulses, proportional to the derivative of the secondary voltage are developed across the coils 37, 38 (FIG. 3(d)), occurring at each voltage transition across the zero datum, that is, at the instant of line current zero, and they are applied to a capacitor 42 through the switch contact 30, a Zener diode 43 being connected in shunt to limit the magnitude of these pulses.

Thus, the voltage stored in capacitor 31 is proportional to the line voltage (V), at current zero, and the voltage stored in capacitor 42 is proportional to the derivative of line current ($di/dt$) at current zero.

The relationship between these two quantities is determined by the output device 12, this device comprising a ratio-determining stage followed by a balance-indicator stage. The former stage includes a potential divider comprising a fixed resistor 44 and a potentiometer 45; the wiper arm of the potentiometer is connected to the capacitor 42 and to another potentiometer 46 which is also connected to the resistor 44, the wiper arm of this potentiometer 46 being connected to the other capacitor 31. Also connected in this stage is a selector switch 48 which is connected to the gate electrode of a transistor 49 which possesses an extremely low leakage current, e.g. of the "insulated-gate" metal oxide-silicon field-effect type. The following balance-indicator stage is conventional in form, and includes two transistors 50, 51 connected as a long-tailed pair with a meter 52 connected across their collector electrodes and a variable resistor 54 in their common emitter connection.

In operation, this output device is initially set-up with the switch 48 in position A and the capacitors discharged, the variable resistor 54 being adjusted to balance the meter 52 against the effective input voltage, i.e. that developed across the fixed resistor 44.

Now, upon a fault occurring in the protected system a tripping signal for the protective circuit-breaker 2 is produced at terminal 11 and this results in the timing circuit 10 being energised and the capacitors 31, 42 charged in the manner described; the period for which this timing circuit is energised may conveniently correspond to two cycles of the A.C. system frequency to obtain a mean reading over four "current zero" transitions or such shorter period may be determined by the breaker operating time, an even number of half cycles being preferred in order to compensate for irregularities in any one half cycle.

With the output device preset as described, switch 48 is now moved to position B and the wiper arm on potentiometer 45 is adjusted to bring the meter 52 back into balance. This instrument is thus balanced against the voltage across capacitor 42 ($di/dt$) since it is this quantity, developed across the upper portion of potentiometer 45, which constitutes the additional input to transistor 49 under this condition. Subsequently, switch 48 is moved to position C and the wiper arm on potentiometer 46 is adjusted to bring the meter 52 back into balance. The meter is thus now balanced against the voltage across capacitor 31 (V) since it is this quantity, developed across the upper portion of potentiometer 45, which now constitutes the additional input to transistor 49. Thus, whereas the voltage across the whole of potentiometer 46 is representative of $di/dt$ the voltage across its upper portion is now representative of V, and accordingly by appropriate calibration the displacement of the wiper arm can be made to indicate directly the ratio of V to $di/dt$, i.e. the inductance of the line which, with known line paramesters, is in turn indicative of the distance along the line to the fault.

It is to be understood that the circuits described disclose only one partciular form of this apparatus by way of example, and various modifications may be made without departing from the scope of this invention. For example, one output device 12 may be provided for a number of groups of circuits 5–9 associated with different lines or different phases of a polyphase system, the device 12 being plugged-in as required. In this particular instance, further capacitors may be connected across the two sets of input terminals to this device, effectively in parallel with storage capacitor 31, 42, so as to receive the charge from these latter capacitors as the device is plugged-in, this feature enabling lower rated components to be employed in the output device since the voltage stored is then reduced as the total charge is shared. This feature is particularly advantageous since it permits high voltages to be accommodated by the circuit 5, so that the diodes therein always operate over the linear part of their characteristic, whilst the voltage to which the transistor 49 is subjected is reduced accordingly.

In addition, various other circuit features, e.g. a switching circuit for discharging the storage capacitors following a measuring sequence, have been omitted for clarity.

I claim:

1. Apparatus for determining the distance between a supervisory station in an A.C. system and a fault affecting this system comprising, sensing means for monitoring both the system voltage at said station and the system current, first control means coupled to the sensing means and including circuit means responsive to the monitored voltage, a switching mechanism responsive to the monitored current and operative on the circuit means whenever the current traverses its zero datum whereby to determine the value of said voltage occurring at the instant of current zero, and first storage means for storing the voltage value, second control means coupled to the sensing means and responsive to the monitored current, the second control means including means for determining the instant at which the current traverses its zero datum, a differentiator for determining the derivative of the current at that instant, and second storage means for storing a voltage value corresponding to the current derivative, and output means coupled to both the first and second storage means for measuring the ratio between the voltage values whereby to derive therefrom the inductance of the system and determine the said distance by comparing this inductance value with that of the unfaulted system.

2. Apparatus according to claim 1, comprising a timing circuit for rendering the first and second control means operative only during a predetermined period following the occurrence of a fault affecting the said system, the minimum duration of said period being not less than half a cycle of the frequency of the A.C. system.

3. Apparatus according to claim 2, wherein the switching mechanism is operative to cause the circuit means to sample the monitored voltage waveform from the sensing means during each half cycle between its instant of zero magnitude and the said instant of current zero.

4. Apparatus according to claim 3, wherein the circuit means comprises a plurality of unidirectionally conducting devices so connected as to develop all the waveform samples unidirectionally.

5. Apparatus according to claim 4, wherein the first and second control members each comprise a capacitor, the two capacitors storing the peak levels of the voltage value at current zero and the voltage value corresponding to the current derivative, respectively.

6. Apparatus according to claim 5, wherein the output means comprises a balance indicator and a first control member and a second control member for respectively receiving the voltage values stored by the capacitors and each adjustable independently to balance the said indicator.

7. Apparatus according to claim 6, wherein the first and second control members each comprise a potentiometer having a wiper arm, the first potentiometer being wholly connected across that part of the second potentiometer extending between one limit of its resistance and its wiper arm, and switching means for successively sampling the voltage across said part of the second potentiometer and the voltage across the corresponding part of the first potentiometer whereby, by maintaining the indicator at balance, the displacement of the wiper arm on said first potentiometer is indicative of the ratio of the voltages across the two storage capacitors.

8. Apparatus according to claim 5, wherein the output means are selectively connectable to a plurality of different circuits for determining the ratio of the said two values exhibited by these circuits representative of the inductances possessed by their associated lines or their associated phases in a polyphase A.C. system.

9. Apparatus for determining the distance between a supervisory station in an A.C. system and a fault affecting this system comprising, sensing means for monitoring both the system voltage at said station and the system current, first control means coupled to the sensing means and including circuit means responsive to the monitored voltage, switching means responsive to the monitored current and operative to cause the circuit means to sample the monitored voltage waveform from the sensing means during each half cycle between its instant of zero magnitude and the said instant of current zero, and a first storage capacitor for storing the sampled voltage value, second control means coupled to the sensing means and responsive to the monitored current, the second control means including means for determining the instant at which the current traverses its zero datum, a differentiator for determining the derivative of the current at that instant, and a second storage capacitor for storing a voltage value corresponding to the current derivative, and an output circuit coupled to both the first and second storage capacitors for measuring the ratio between the voltage values whereby to derive therefrom the inductance of the system and determine the said distance by comparing this inductance value with that of the unfaulted system.

References Cited

UNITED STATES PATENTS 3,281,673   10/1966   Richardson _____ 324—52

GERARD R. STRECKER, Primary Examiner

317—36

U.S. Cl. X.R.